United States Patent [19]

Fujiwara et al.

[11] Patent Number: 5,201,004
[45] Date of Patent: Apr. 6, 1993

[54] SPEECH RECOGNITION METHOD WITH NOISE REDUCTION AND A SYSTEM THEREFOR

[75] Inventors: Ryuhei Fujiwara; Keiko Shimada, both of Tokyo, Japan

[73] Assignee: NEC Corporation, Tokyo, Japan

[21] Appl. No.: 704,160

[22] Filed: May 22, 1991

[30] Foreign Application Priority Data

May 22, 1990 [JP] Japan ................... 1-131857
Jun. 30, 1990 [JP] Japan ................... 1-173036

[51] Int. Cl.⁵ .................... G10L 3/00; G10L 5/00
[52] U.S. Cl. ........................... 381/46; 381/43; 381/41
[58] Field of Search .................. 381/41–43, 381/46–50

[56] References Cited

U.S. PATENT DOCUMENTS

| | | | |
|---|---|---|---|
| 3,507,999 | 4/1970 | Schroeder | 381/46 |
| 4,570,232 | 2/1986 | Shikano | 381/43 |
| 4,624,011 | 11/1986 | Watanable et al. | 381/43 |
| 4,696,041 | 9/1987 | Sakata | 381/46 |
| 4,852,181 | 7/1989 | Morito et al. | 381/46 |
| 4,882,756 | 11/1989 | Watari | 381/42 |

FOREIGN PATENT DOCUMENTS

| | | | |
|---|---|---|---|
| 0219797 | 9/1989 | Japan | 381/46 |
| 0274198 | 11/1989 | Japan | 381/46 |
| 0140798 | 5/1990 | Japan | 381/46 |
| 0387791 | 9/1990 | Japan | 381/46 |
| 0296297 | 12/1990 | Japan | 381/46 |

OTHER PUBLICATIONS

Sakoe et al., "A High Speed DP-Matching Algorithm Based on Beam Search and Vector Quantization", SP87-26, Jun. 26, 1987, The Institute of Electronics, Information and Communication Engineers, Japan.

*Primary Examiner*—Robert L. Richardson
*Assistant Examiner*—Kee M. Tung
*Attorney, Agent, or Firm*—Sughrue, Mion, Zinn, Macpeak & Seas

[57] ABSTRACT

In a speech recognition system, a method for deciding an input pattern as one of reference patterns includes steps for calculating dissimilarities of the input pattern and the reference patterns and selecting a particular one of the dissimilarities which is lower than a threshold value. In order to reduce noise accompanying an input speech pattern in the input pattern, an average noise level is detected from an input pattern before the input speech pattern is detected and a noise factor is produced corresponding to the average noise level. The dissimilarities are multiplied by the noise factor to produce products and then the products are compared with the threshold value to recognize the input speech pattern. According to one aspect of the speech recognition system, particularly the system using the known clockwise DP matching with a beam search technique, the beam width factor is determined as a function of the noise level.

7 Claims, 10 Drawing Sheets

| NOISE LEVEL | NOISE FACTOR |
|---|---|
| 0 | 1.0 |
| 1 | 0.9 |
| 2 | 0.7 |
| 3 | 0.4 |
| 4 | 0.3 |
| 5 | 0.2 |
| 6 | 0.1 |
| 7 | 0.07 |
| 8 | 0.05 |

|     | t1 | t2 | t3 | t4 | t5 | ····· | tj | t(j+1) |
|-----|----|----|----|----|----|-------|----|--------|
| 251 | 0  | 0  | 2  | 3  | 2  |       | 1  | 0      |
| 252 | 0  | 0  | 3  | 5  | 4  |       | 2  | 0      |
| 253 | 0  | 0  | 8  | 8  | 7  |       | 6  | 0      |
| ⋮   |    |    |    |    |    |       |    |        |
| 25m | 0  | 0  | 2  | 2  | 1  |       | 1  | 0      |
| 27  | 0  | 0  | 1  | 1  | 1  |       | 1  | 0      |

| 9392312 — TELEPHONE NUMBER ||||||
|-----|----|----|----|-------|----|
|     | t3 | t4 | t5 | ····· | tj |
| 251 | 2  | 3  | 2  |       | 1  |
| 252 | 3  | 5  | 4  |       | 2  |
| 253 | 8  | 8  | 7  |       | 6  |
| ⋮   |    |    |    |       |    |
| 25m | 2  | 2  | 1  |       | 1  |

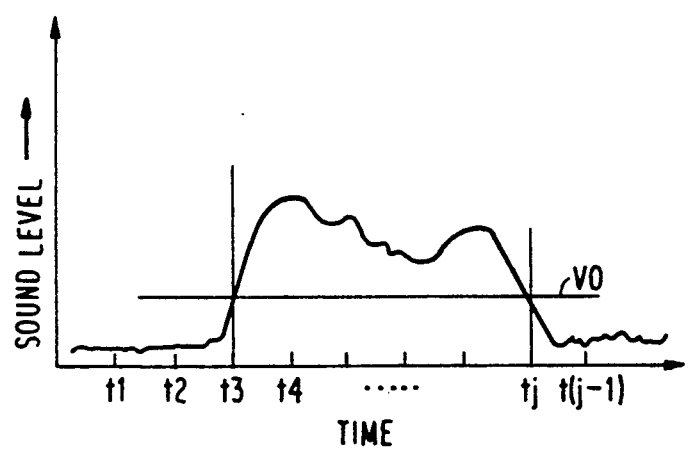

SPEECH RECOGNITION METHOD WITH NOISE REDUCTION AND A SYSTEM THEREFOR

BACKGROUND OF THE INVENTION

The present invention relates to speech recognition for recognizing a speech uttered as one of a plurality of stored reference patterns and, in particular, to a speech recognition method and system for reducing the noise accompanying the speech uttered.

In a known speech recognition system, a speech uttered is converted into an input speech signal by an electromechanical transducer such as a microphone. The input speech signal is analyzed by a pattern analyzer and is converted into a digital input pattern signal. The input pattern signal is memorized in an input memory as a memorized pattern. The memorized pattern is compared with each of the stored reference patterns in a reference memory and a dissimilarity is produced therebetween. When a particular one of the reference patterns provides the minimum dissimilarity, the speech uttered is recognized as that particular reference pattern. Alternatively, when a specific one of the reference patterns provides a specific dissimilarity smaller than a predetermined threshold value, the speech uttered is recognized as the specific reference pattern.

In actual recognition operation, the input speech signal is accompanied with noise due to presence of background sounds. The input speech signal and the noise are collectively referred to as an input sound signal. Accordingly, the input pattern signal includes a noise component. This result, in a worst case, in a failure of the speech recognition operation.

SUMMARY OF THE INVENTION

It is an object of the present invention to provide a method and a system for recognizing a speech without interference from noise included in the input speech signal.

According to the present invention, a method for recognizing a speech uttered as one of a number of reference patterns registered includes steps for: storing noise levels and corresponding noise factors in a memory: producing an input sound signal comprising an input speech signal representative of the speech uttered and a noise accompanying the input speech signal; analyzing the input sound signal to produce an input pattern signal representative of a pattern of the input sound signal; detecting a start and an end of the input speech signal in the input sound signal to produce a speech detection signal; deriving, as a noise portion, a portion of the input pattern signal before the start of the input speech signal is detected to produce an average noise level; determining one of the noise factors which corresponds to the average noise level by accessing the memory; deriving, as a speech portion, another portion of the input speech pattern during a time duration when the speech detection signal is representative of presence of the input speech signal; indicating one of the reference patterns; calculating a difference between a pattern of the speech portion and one of the reference patterns and producing a product as a dissimilarity by multiplication of the difference and the one of the noise factors and comparing the dissimilarity with a threshold value to recognize the speech as that one of the reference patterns when the dissimilarity is equal to or lower than the threshold value.

According to the present invention, a method for recognizing a speech uttered as one of a number of reference patterns Bl through BN, each of the reference patterns comprising a time sequence of reference feature vectors Bn=Bln, ..., bjn, ..., bJn, comprises: (a) producing an input sound signal comprising an input speech signal representative of the speech uttered and a noise accompanying the input speech signal; (b) analyzing the input sound signal to produce an input pattern representative of a pattern of the input sound signal; (c) observing the input pattern to detect a start and an end of the input speech and to produce a noise level z from a portion of the input pattern before the start is detected; (d) calculating a beam width factor $a(z)=a0\times(z/z0)$ where z0 is a reference noise level and $a0$ is a beam width factor for the reference noise level z0; (e) deriving another portion of the input pattern as an input speech pattern after the start is detected, the input speech pattern A comprising a time sequence of input feature vectors A=al, ..., ai, ..., aI; (f) calculating inter-vector distances dn(i,j) between one of input feature vectors ai and each of reference feature vectors bjn for n=1 to N and j=1 to J; (g) calculating from those dn(i,j) the following asymptotic equation (1):

$$gn(i,j)=dn(i,u)+gmin\{gn(i-1,j-p)\} \quad (1).$$

where p=0, 1, 2, ..., and gmin {(i−1,j−p)} is a minimum of gn(i−1,j−p) for various values of p; (h) selecting the minimum one of gn(i,j) for n=1 to N and j=1 to J as gmin and calculating a threshold value $\theta i$=gmin−$a(z)$; (i) deciding as decided gn(i,j) ones of gn(i,j) which fulfill the following condition:

$$gn(i,j)<\theta(i) \quad (2);$$

(j) omitting n and j which do not fulfill the formula (2), (k) repeating the steps (f) to (j) for i=i+1 until i=I to produce dissimilarities of Dn(I,Jn)=gn(I,Jn) for reference patterns except ones omitted at step (j); and (l) selecting the minimum one of those dissimilarities Dn(I,Jn) for the reference patterns and deciding the input speech as one of the reference patterns which gives the minimum dissimilarity.

According to the present invention, a system for recognizing a speech uttered comprises: reference memory means for memorizing a number of reference patterns; means for producing an input sound signal comprising an input speech signal representative of the speech uttered and a noise accompanying the input speech signal; means coupled to the producing means for analyzing the input sound signal to produce an input pattern signal representative of a pattern of the input sound signal; input memory means coupled to the analyzing means for memorizing the input pattern signal; speech detecting means coupled to the producing means for detecting a start and an end of the input speech signal in the input sound signal to produce a speech detection signal, the speech detection signal representing presence and absence of the input speech signal in the input sound signal; means coupled to the speech detecting means for holding the speech detecting signal; noise level detecting means coupled to the input memory means and the holding means for deriving, as a noise portion, a portion of the input pattern signal before the start is detected to produce an average noise level; noise level/factor memory means for storing noise levels and corresponding noise factors; detecting means coupled to the noise level detecting means level/factor memory means detecting one of the noise factors which corresponds to the average noise level; calculating means coupled to the reference memory means, the input memory means and the detecting means for calculating a difference between a pattern of a speech portion of the input pattern signal and one of the reference patterns and producing a product as a dissimilarity by multiplication of the difference and the one of the noise factors; and deciding means coupled to the calculating means for comparing the dissimilarity with a threshold value to decide the speech as the one of the reference patterns when the dissimilarity is equal to or lower than the threshold value.

According to the present invention, a system for recognizing a speech uttered, comprises: reference memory means for memorizing a number of reference patterns Bl through BN, each of the reference patterns comprising a time sequence of reference feature vectors Bn=bln, ..., bjn, ..., bJn; means for producing an input sound signal comprising an input speech signal representative of the speech uttered and a noise accompanying the input speech signal; means coupled to the producing means for analyzing the input sound signal to produce an input pattern representative of a pattern of the input sound signal; observing means coupled to the producing means for observing the input pattern to detect a start and an end of the input speech and to produce a noise level z from a portion of the input pattern before the start is detected; means coupled to the observing means responsive to the noise level z for calculating a beam width factor $a(z)=a0 \times (z/z0)$ where z0 is a reference noise level and a0 is a beam width factor for the reference noise level z0; input memory means coupled to the analyzing means for memorizing another portion of the input pattern as an input speech pattern after the start is detected, the input speech pattern A comprising a time sequence of input feature vectors A=al, ..., ai, ..., aI; distance calculating means coupled to the reference memory means and the input memory means for calculating inter-vector distances dn(i,j) between one of input feature vectors ai and each of reference feature vectors bjn for n=1 to N and j=1 to J; asymptotic equation calculating means coupled to the distance calculating means for calculating from those dn(i,j) the following asymptotic equation (1):

$$gn(i,j)=dn(i,j)+gmin\{gn(i-1,j-p)\}, \quad (1)$$

where p=0, 1, 2, ..., and gmin{gn(i−1,j−p)} is a minimum of gn(i−1,j−p) for various value of p; selecting means coupled to the asymptotic equation calculating means and the beam width factor calculating means for selecting the minimum one of gn(i,j) for n=1 to N and j=1 to J as gmin and calculating a threshold value $\theta i = gmin - a(z)$, the selecting means deciding as decided gn(i,j) ones of gn(i,j) which fulfill the following condition:

$$gn(i,j) < \theta(i) \quad (2);$$

control means coupled to the reference memory means, the input memory means, the distance calculating means, the asymptotic equation calculating means and the selecting means for omitting n and j which do not fulfill the formula (2) and making the distance calculating means, the asymptotic equation calculating means and the selecting means repeatedly operate for i=i+1 until i=I to produce dissimilarities of Dn(I,Jn)=gn(I,Jn) for reference patterns except ones omitted; and means coupled to the asymptotic equation calculating means for selecting the minimum one of those dissimilarities Dn(I,Jn) for the reference patterns and deciding the input speech as one of the reference patterns which gives the minimum dissimilarity.

BRIEF DESCRIPTION OF THE DRAWINGS

FIG. 9 is a graph illustrating an example of the output signal from the rectifying circuit during a recognition mode;

FIG. 10 is a view illustrating an example of the content in the work area during the recognition mode;

DESCRIPTION OF PREFERRED EMBODIMENTS

Figure 1:
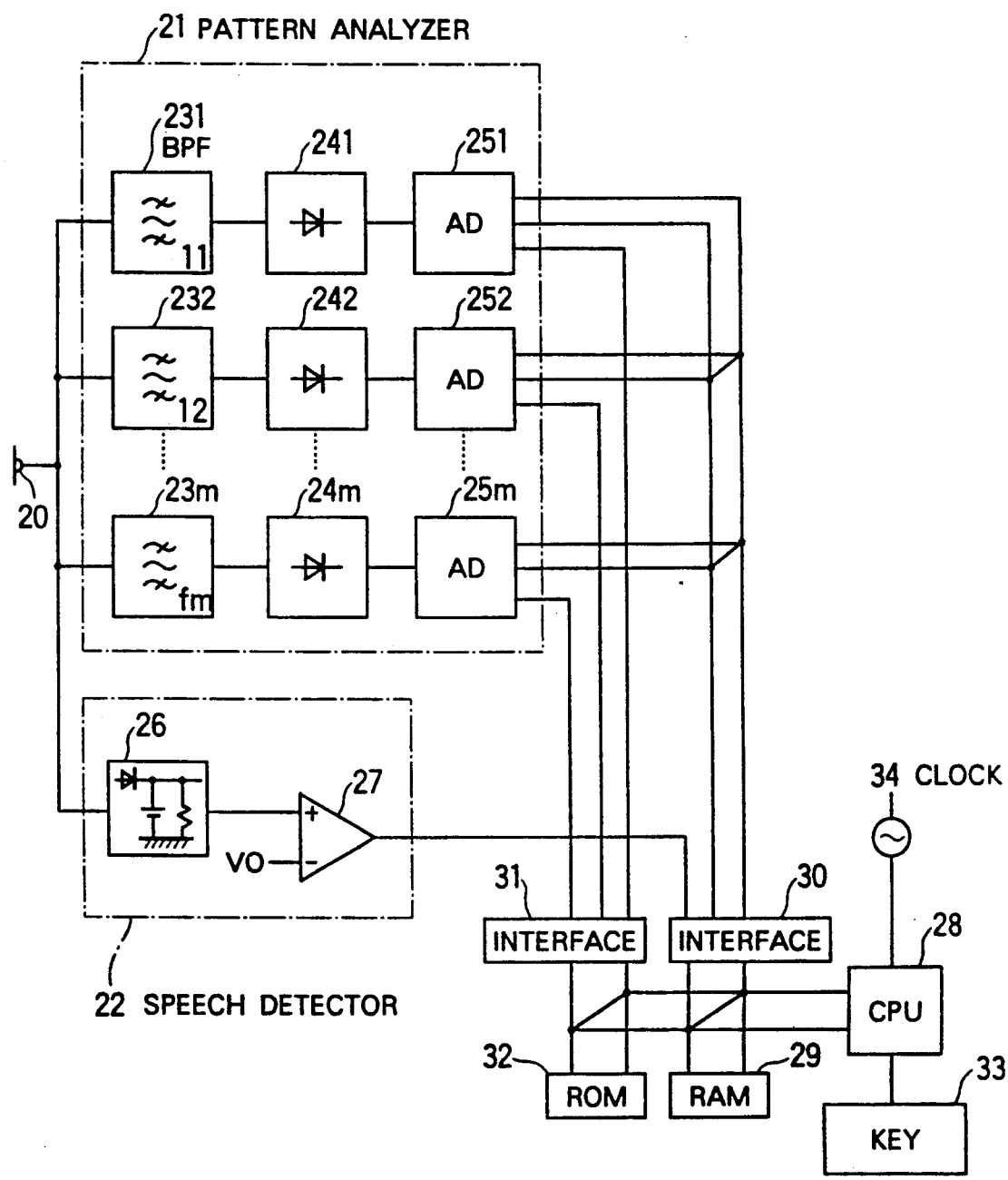
FIG. 1 is a block diagram of a speech recognition system according to an embodiment of the present invention.

Referring to FIG. 1, the system according to an embodiment of the present invention comprises a microphone 20 for converting a sound into an electric signal as an input sound signal, a pattern analyzer 21 for analyzing the input sound signal into an input pattern, and a speech detector 22 for detecting a speech portion in the input sound signal.

Figures 2, 3:
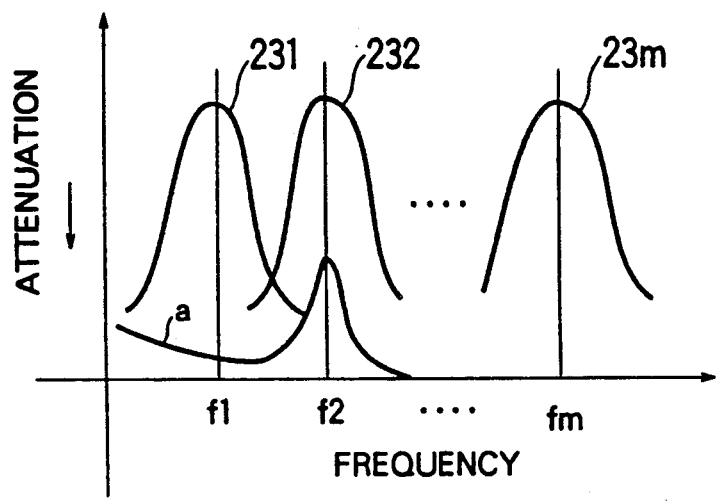
FIG. 2 is a graph illustrating frequency responses of bandpass filters of a pattern analyzer in FIG. 1.
FIG. 3 is a noise level to noise factor list memorized in a read only memory (ROM) in FIG. 1.

The pattern analyzer 21 comprises a plurality of (m) bandpass filters 23*l* to 23*m* commonly connected to the microphone 20. The bandpass filters 23*l* to 23*m* have different passbands with central frequencies fl to fm as shown in FIG. 2. A plurality of (m) rectifiers 24*l* to 24*m* are connected to the bandpass filters 23*l* to 23*m*, respectively, and a plurality of (m) analog-to-digital (AD) converters 25*l* to 25*m* are connected to the rectifiers 24*l* to 24*m*, respectively. Accordingly, the input sound signal is separated into different frequency component signals by the bandpass filters 23*l* to 23*m*. The frequency component signals are rectified by rectifiers 24*l* to 24*m*, respectively, and are converted by AD converters 25*l* to 25*m*, respectively, into m digital signals representative of levels of the frequency component signals.

Each of m digital signals is referred to as a frequency component level signal. A set of the m digital signals is referred to as a feature vector or a sound level signal. Since the input sound signal routinely continues for a time period, the AD converters 25*l* to 25*m* produce a time sequence of feature vectors as the input pattern representative of input sound signal.

The speech detector 22 comprises a rectifier circuit 26 connected to the microphone 20 and a voltage comparator 27 connected to the rectifier circuit 26. The rectifying circuit 26 rectifies and smooths the input sound signal from the microphone 20 to produce a rectified input signal. The comparator 27 compares the rectified input signal with a threshold value V0 and produces a speech detection signal. The speech detection signal has a low level (0) when the rectified input signal is lower than the threshold level V0 but has a high level (1) when the rectified input signal is equal to or higher than the threshold level v0. The low level of the speech detection signal indicates the absence of the speech signal in the input indicates the presence of the speech signal in the input sound signal. Thus, the change of the speech detection signal from 0 to 1 indicates a start of the speech and the change of the speech detection signal from 1 to 0 denotes an end of the speech.

The speech recognition system further comprises a central processing unit (CPU) 28 and a random access memory (RAM) 29 connected to the AD converters 25*l* to 25*m* and the voltage comparator 27 through an input interface 30 and an output interface 31. Further, the CPU 28 is connected to a read only memory (ROM) 32, a keyboard 33 and a clock 34.

The CPU 28 performs a registration program and a recognition program memorized in the ROM 32 according to a mode selection signal from the keyboard 33 as described hereinafter.

The RAM 29 has a work area for storing the input pattern and a registration area for memorizing a plurality of reference patterns.

The ROM 32 memorizes programs for operation of the CPU 28 and a list of noise level and noise factor. An example of the list is shown in FIG. 3. The list is experimentally created based on the rate of recognition by, for example, simulation.

The clock 34 generates a clock pulse signal with a pulse repetition period of, for example, 20 msec.

Now, a description of the operation of the speech recognition system of FIG. 1 which is applied to an automatic telephone dialing system of a speech access type will be provided.

In order to register a telephone number, for example, "9392312" and a corresponding speech, for example, "Smith", a user of the system inputs the registration mode signal and then the telephone number by use of the keyboard 33, and then utters the speech to the microphone 20.

Figure 4:
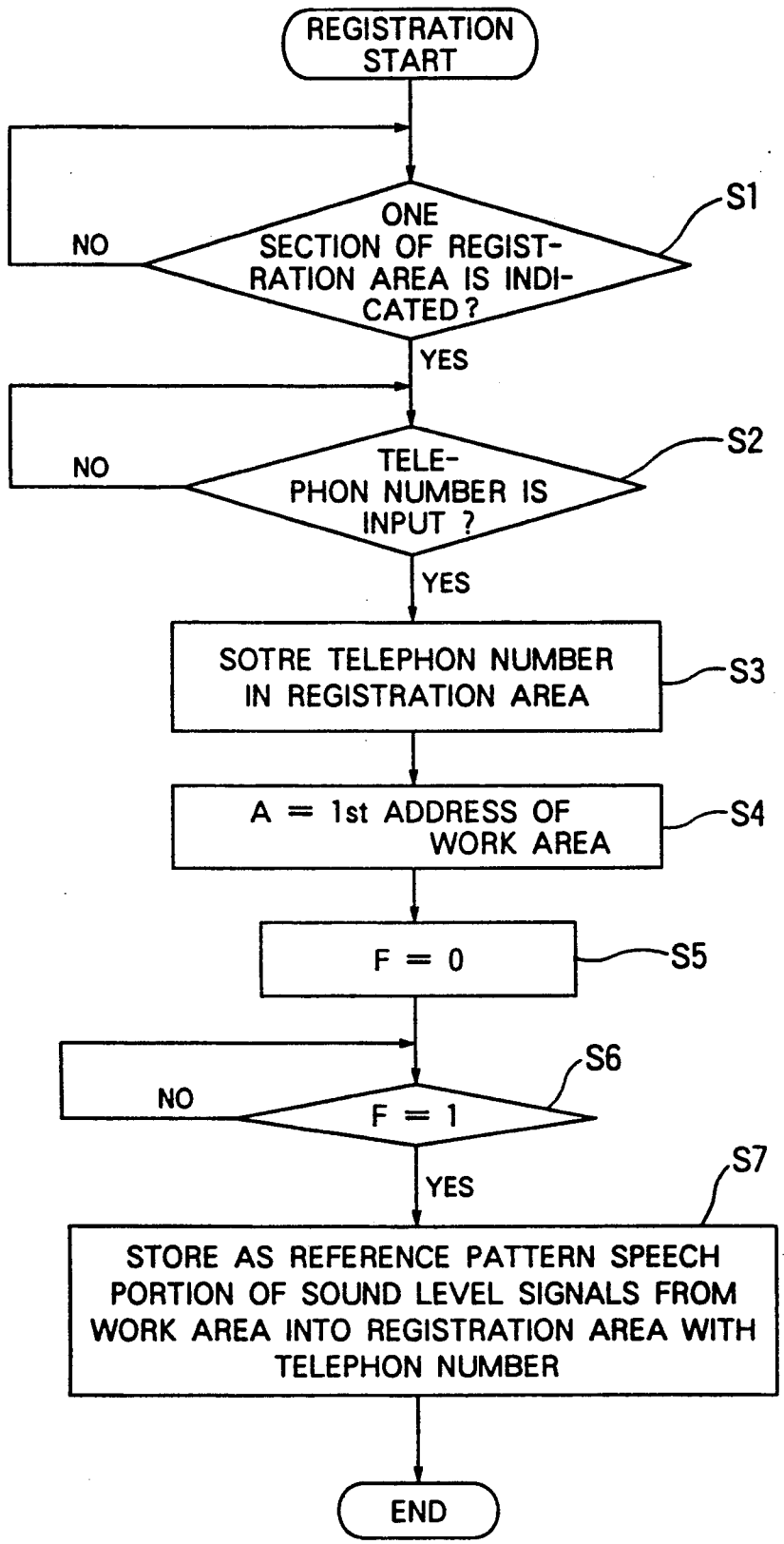
FIG. 4 is a flow chart illustrating an operation of a central processor unit (CPU) in FIG. 1 during a speech registration mode.

Referring to FIG. 4, the CPU 28 performs the registration operation in response to the mode selection signal indicating the registration mode.

At first, the CPU 28 indicates one of the sections of the registration area in the RAM 29 as an indicated section at step S1. Then, after confirming input of the telephone number at step S2, the CPU 28 writes the telephone number into the indicated section of the registration area at step S3. Then, the CPU 28 produces as an address signal A a first address of the work area in the RAM 29 at step S4 and then produces flag of 0 (F=0) at step S5. Thereafter, the CPU 28 observes the flag until the flag F changes to 1 at step S6.

Meanwhile, the CPU 28 is interrupted by clock pulses from clock 34 and performs a take-in or storing operation in response to each of the clock pulses.

Figure 5:
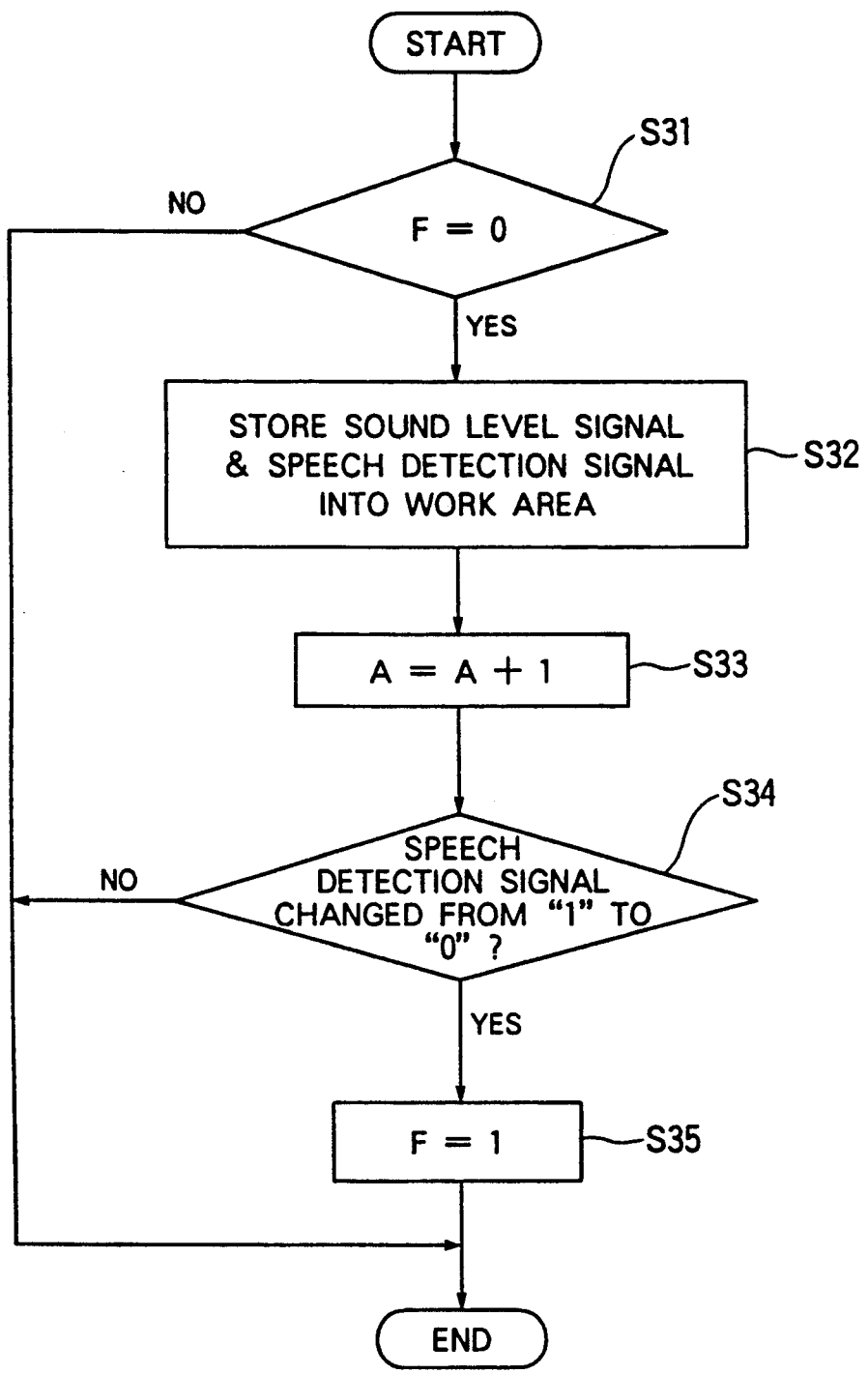
FIG. 5 is a flow chart illustrating operation of the CPU for storing an input pattern into a work area in a random access memory (RAM) in FIG. 1.

Referring to FIG. 5, the CPU 28 is responsive to the clock pulse from the clock 34 and confirms whether or not the flag F is 0 at step S31. When the flag F is not 0, the CPU 28 finishes the storing operation. On the other hand, when the flag F is 0, the CPU 28 delivers a take-in signal to the AD converters 25*l* to 25*m* through the output interface 31 and to the RAM 29. Thus, the sound level signals or the feature vector is stored into the first address of the work area in the RAM 29 at step S32. Then, the CPU 28 changes the address signal A into a second address of the work area (A=A+1) at step S33 and detects whether or not the speech detection signal has changed from 1 to 0 at step S34. When the CPU 28 detects that the speech detection signal has changed from 1 to 0, it changes the flag F to 1 at step S35 and finishes the operation. Alternatively, when the speech detection signal has not changed from 1 to 0, the take-in operation is directly ended. The CPU 28 repeats the take-in operation of steps S31 to S34 in response to the clock pulses until the speech detection signal changes from 1 to 0.

In the registration mode, the speech is uttered in a quiet situation without substantial background noise. Therefore, the input sound signal comprises the input speech signal substantially free from noise. A waveform of the input sound signal after being processed by the rectifier circuit 26 (FIG. 1) is exemplarily shown in FIG. 6.

Figures 6, 7, 8:
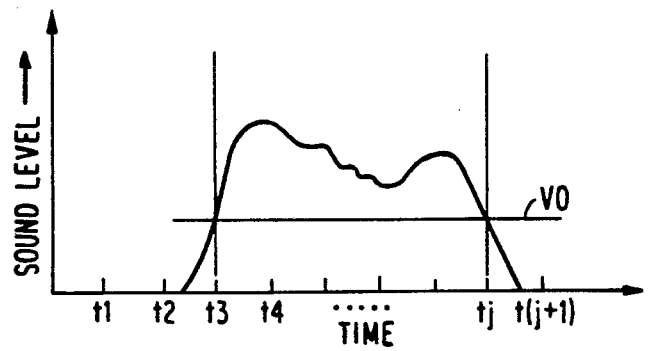
FIG. 6 is a graph illustrating an example of an output signal from a rectifying circuit in FIG. 1.
FIG. 7 is a view illustrating an example of the content in the work area during the registration mode.
FIG. 8 is a view illustrating an example of the content in one of the sections of a registration area in the RAM.

Referring to FIG. 6, it is provided that the flag F is set to 0 at a time install t1 (step S5 in FIG. 4) and the clock pulses are generated at time instants t1 to t(j+1). In response to the clock pulse at t1, the CPU 28 performs the take-in operation of steps S31 to S34. The input speech signal has no level at t1 as shown in FIG. 6. Accordingly, AD converters 25*l* to 25*m* and the voltage comparator 27 produce signals of 0 as the frequency component signals and the speech detection signals. Therefore, 0 is written into the first address in the work area of the RAM 29 at step S32 as shown in FIG. 7. There is no input signal at t2, and 0 is also written into the second address in the work area. At t3, the input signal has a level equal to the threshold level V0. Accordingly, the speech detection signal from the voltage comparator 27 becomes 1. It will be noted that frequency component signals have certain levels. Accordingly, the sound level signal representative of those levels are stored in the third address of the work area. Thereafter, the speech detection signal of 1 and the subsequent sound level signals are stored in subsequent addresses of the work area at t4 to t(j+1) in response to each clock pulse as shown in FIG. 7. The input speech signal eventually drops to the threshold level v0 at tj and is zero level at t(j+1). Accordingly, at t(j+1), the speech detection signal changes from 0 to 1 so that the flag F is set to 1 at step S35 in FIG. 5.

Returning to FIG. 4, since the flag F is 1 at step S6, the CPU 28 stores a speech portion of the sound level signals in the work area of the RAM 29 into the selected section of the registration area of the RAM 29 as the reference pattern and completes the registration mode. The speech portion of the frequency component signals are ones generated during a time duration from t3 to tj when the speech detection signal is maintained 1. Thus, a content of the selected section of the registration area is shown in FIG. 8.

The above-described registration mode is repeated to register a number of telephone numbers and the corresponding speeches.

When the user of the system desires to call Mr. Smith by telephone, he selects the recognition mode and utters the speech of "Smith". The speech uttered is generally accompanied with a background noise, especially, in the application to a mobile telephone set. Accordingly, the input sound signal comprises the input speech signal and the noise. A waveform of the input sound signal after being processed by the rectifying circuit 26 (FIG. 1) is exemplarily shown in FIG. 9.

Referring to FIG. 9, the input sound signal has a small level due to the noise at a duration of t1 to t3 and after tj when the speech is not uttered. The noise always exists even when the speech is being uttered. Therefore, the level of the input speech signal is affected by the noise level. A frequency distribution of the noise is exemplarily shown by a curve a in FIG. 2.

Figure 11:
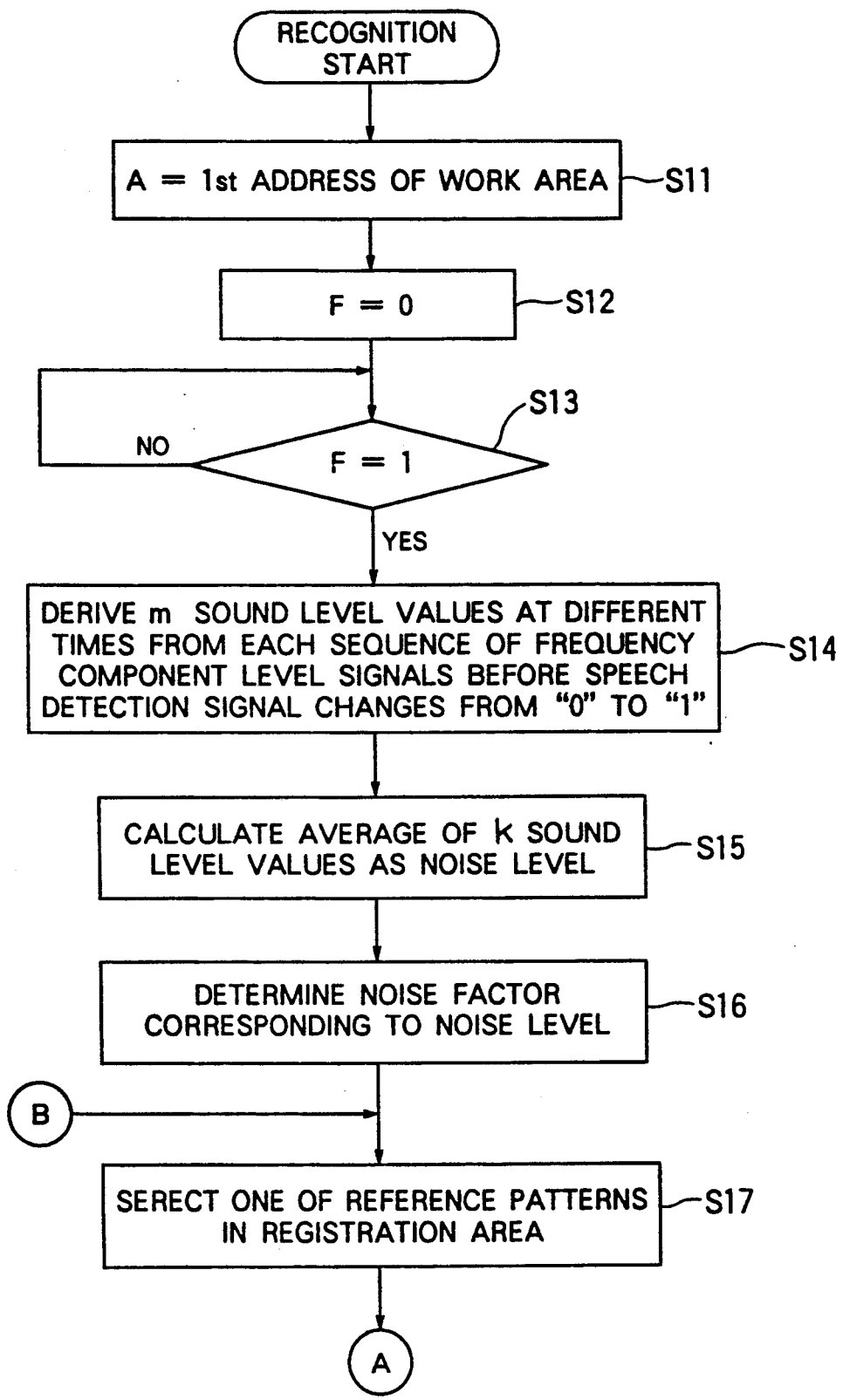
FIG. 11 shows a portion of a flow chart of operation of the CPU during the recognition mode.

Referring to FIG. 11, the CPU 28 receives the mode selection signal indicating the recognition mode and performs the recognition operation.

At first, the CPU 28 produces as an address signal A a first address of the work are in the RAM 29 at step S11 and sets the flag 0 (F=0) at step S12. Then, the CPU 28 observes the flag until the flag becomes 1 at step S13.

Meanwhile, the CPU 28 is interrupted by clock pulses from the clock 34 and repeats the take-in operation as mentioned above in connection with FIG. 5 to store the time sequence of sound level signals from the pattern analyzer 21 into the work area.

Returning to FIG. 9, the input sound signal includes the noise even during the period t1 to t3 when the speech is not uttered. Accordingly, the frequency component level signals from, for example, the AD converters 251 and 252 represent small levels such as 1 and 3, as shown in FIG. 10. Furthermore, the speech portion of those frequency component level signals have levels increased by the noise levels.

When the sound level signals for a time duration from t1 to t(j+1) are stored into the work are in the RAM 29, the flag is set 1 (F=1) at step S35 in FIG. 5. Therefore, the CPU 28 detects F=1 at step S13 in FIG. 11. Then, the CPU 28 derives a predetermined number of (k) sound level values from each sequence of frequency component level signals before the speech detection signal changes from 0 to 1, at step S14. Then, the CPU 28 calculates an average of k sound level values as a noise level at step S15. Then, the CPU 28 refers to the noise level to noise factor list (FIG. 3) in ROM 32 and determines a noise factor corresponding to the noise level at step S16.

For example, when k=2 at step S14, the CPU 28 derives sound level values of each of frequency component level signals at t1 and t2 in FIG. 10. Accordingly, the noise level of N25*l* to N25*m* for each of the frequency components, that is, for each of the AD converters 25*l* to 25*m* is given by:

$$N25l = (1 + 1)/2 = 1,$$
$$N252 = (3 + 3)/2 = 3,$$
$$N253 = (0 + 0)/2 = 0,$$
$$\vdots$$
$$N25m = (0 + 0)/2 = 0.$$

Therefore, the noise factor K25*l* to K25*m* corresponding to each noise level is determined by accessing the noise level to noise factor list shown in FIG. 3 as follows:

$$K251 = 0.9,$$
$$K252 = 0.4,$$
$$K253 = 1.0,$$
$$\vdots$$
$$K25m = 1.0$$

Thereafter, the CPU 28 selects one of reference patterns registered in the registration area in RAM 29, at step S17.

Figure 12:
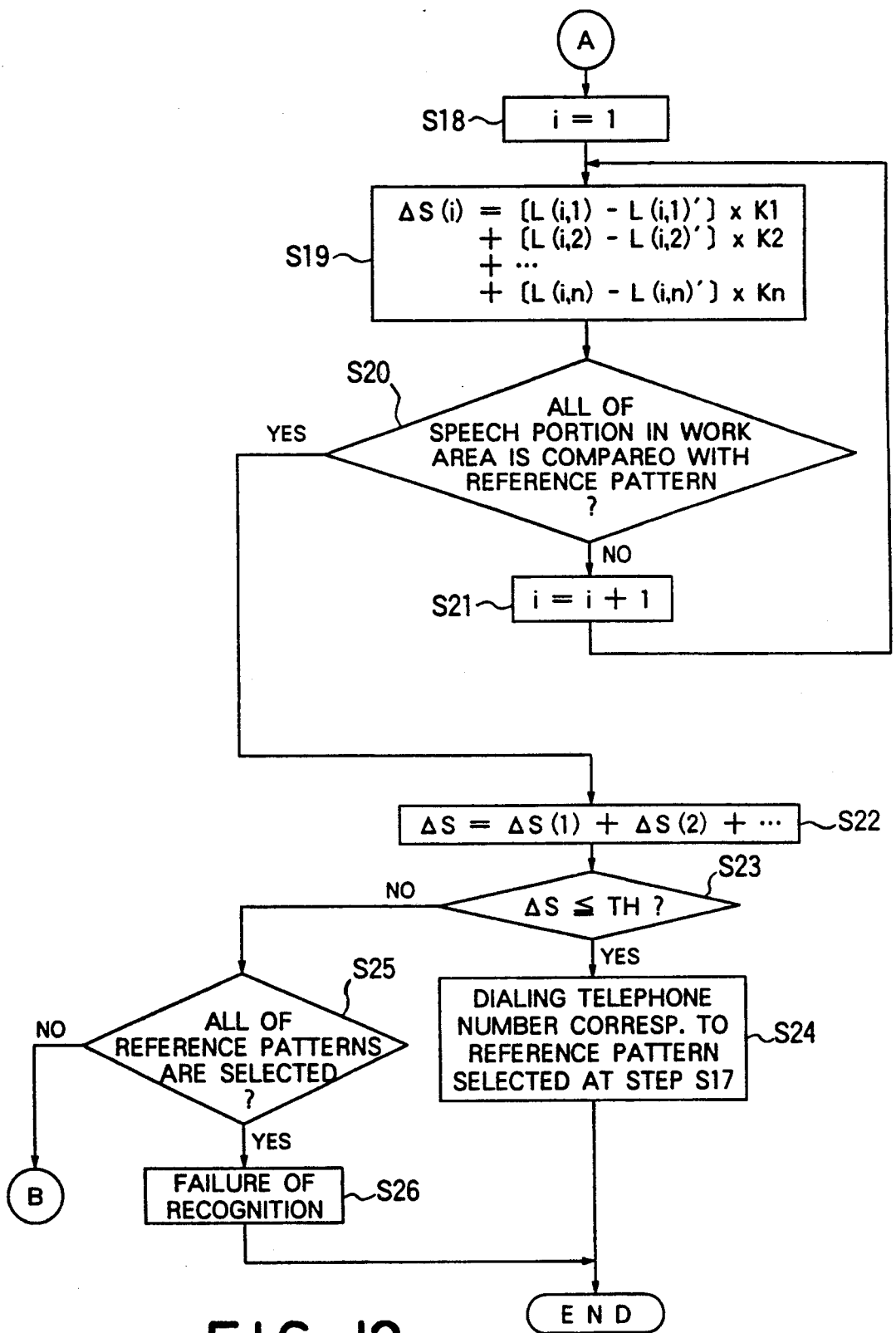
FIG. 12 shows a remaining portion of the flow chart for the recognition mode.

Then, the CPU 28 calculates a distance $\Delta S(i)$ weighted by the noise factor between the speech portion of the time sequence of sound level signals in the work area and the feature vectors of the selected reference pattern at steps S18 to S21 in FIG. 12.

That is, $\Delta S(i)$ is given by:

$$\Delta S(i) = \{L(i,1) - L(i,1)'\} \times K251 +$$
$$\{L(i,2) - L(i,2)'\} \times K252 + \ldots + \{L(i,m) - L(i,m)'\} \times K25m.$$

$L(i,y)$ is a level value of i-th frequency component level signal stored into the work area from the y-th AD converter 25y after the speech detection signal changes from 0 to 1. $L(i,u)'$ is a level value of i-th frequency component level signal from the y-th AD converter of the selected reference pattern which is stored into the registration area.

For example, providing that the reference pattern shown in FIG. 8 is selected at step S17 for comparing with the speech portion in the work area shown in FIG. 10, S(1) is given by:

$$\Delta S(1) = (3 - 2) \times 0.9 +$$
$$(5 - 3) \times 0.4 +$$
$$(8 - 8) \times 1.0 + \ldots +$$
$$(2 - 2) \times 1.0$$
$$= 1.7.$$

Then, when all of the speech portions in the work area have not yet been compared with the reference pattern at step S20, the CPU 28 proceeds to step 21. Then, i is changed to (i+1)=2 and then step 19 is performed to calculate $\Delta S(2)$. These operations are repeated until all of the speech portions in the work area are compared with the reference pattern. Thereafter, a sum $\Delta S$ of $\Delta S(1)$, $\Delta S(2)$, ... is calculated at step S22. The CPU 28, then, compares $\Delta S$ with a threshold value TH at step S23. When $\Delta S \leq TH$, the CPU 28 decides that a pattern of the input speech coincides with the selected reference pattern. The CPU 28 reads the telephone number corresponding to the selected reference pattern from the registration area and performs the dialing operation of the telephone number at step S24.

When $\Delta S > TH$, the CPU 28 returns to step S17 through step S25, and selects another reference pattern. Then, the similar operation of steps S18 to S23 is repeated. For the other reference pattern, when $\Delta S > TH$ is obtained, a further reference pattern is selected. The similar manner is repeated until $\Delta S \leq TH$ is obtained. When $\Delta S \leq TH$ is not obtained for all of reference patterns, the CPU 28 decides the recognition is failure at step S26.

Figure 13:
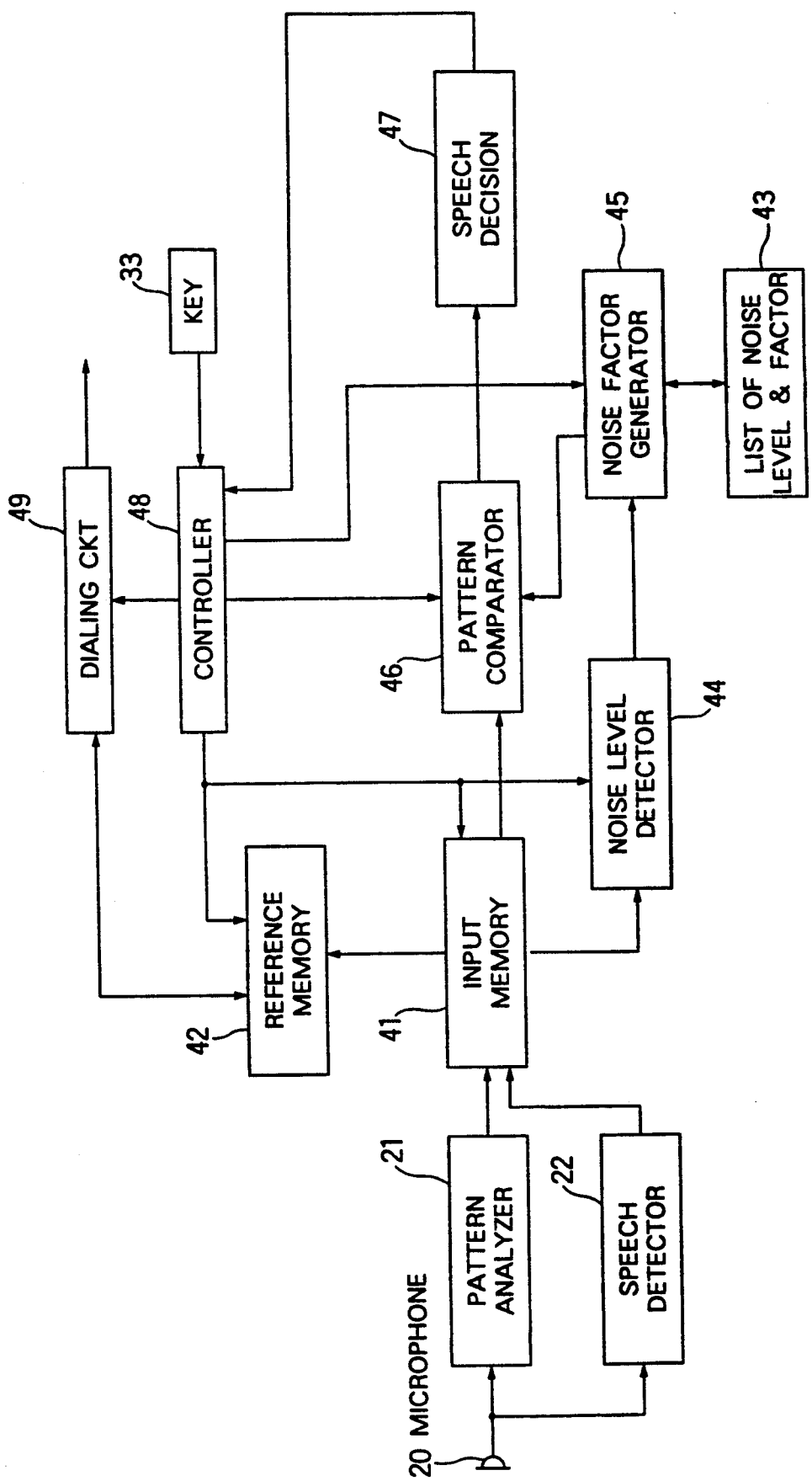
FIG. 13 is a block diagram of another embodiment equivalent to the embodiment of FIG. 1.

Referring to FIG. 13, the shown embodiment is functionally equivalent to the embodiment shown in FIG. 1.

Referring to FIG. 13, a pattern analyzer 21, a speech detector 22 and a keyboard 33 correspond to the pattern analyzer 21, the speech detector 22 and the keyboard 33 in FIG. 1, respectively. An input memory 41 and a reference memory 42 correspond to the work area and the registration area in the RAM 29. A list of noise levels and factors 43 corresponds to the noise level to noise factor list in the ROM 32. A noise level detector 44 correspond to steps S14 and S15 in FIG. 11, and a noise factor generator 45 corresponds to step 16. A pattern comparator 46 corresponds to steps S18 to S22 and a speech decision circuit 47 corresponds to step S23. A dialing circuit 49 corresponds to step S24. A controller 48 corresponds to the other functions of the CPU 28.

In the above-described embodiment, noise levels for frequency components are obtained and noise factors corresponding to the noise levels are determined. Distances between frequency components of the input sound signal and those of the reference pattern are weighted by the noise factors to reduce the noise accompanying the input speech.

In order to reduce the noise, it is possible to modify the threshold value for dissimilarities by the noise level.

Figure 14:
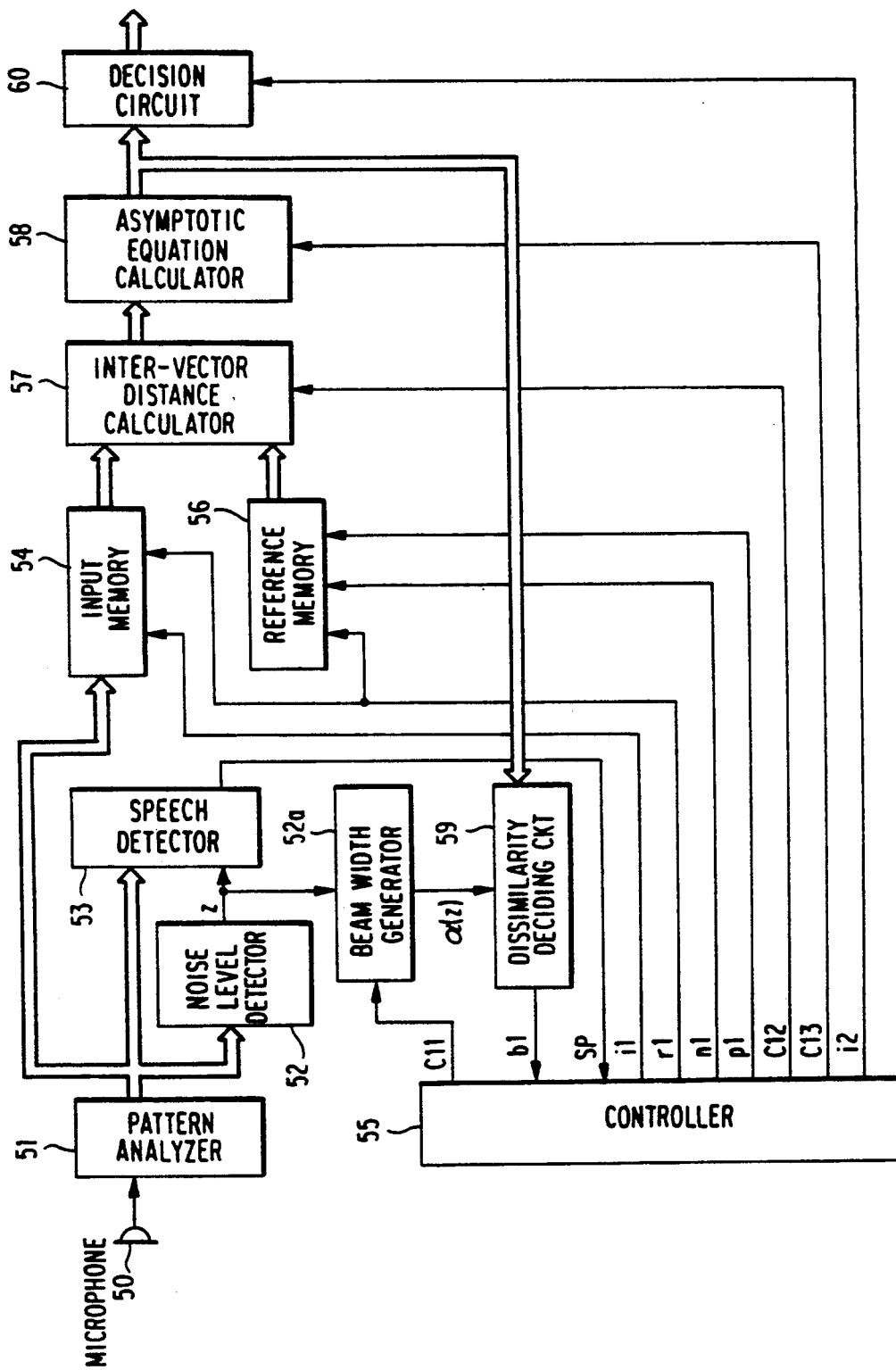
FIG. 14 is a block diagram of a speech recognition system according to another embodiment of the present invention.

Referring to FIG. 14, an input sound signal input through a microphone 50 is applied to a pattern analyzer 51. The input sound signal comprises an input speech signal representative of an input speech and a noise. The pattern analyzer 51 is similar to the pattern analyzer 21 shown in FIG. 1 but a multiplexer is provided at output sides of the AD converters. Accordingly, the frequency component signals from the AD converters 25l to 25m in FIG. 1 are multiplexed to form a signal representative of a feature vector. Accordingly, the pattern analyzer 51 generates a time sequence of feature vector signals.

The feature vectors are applied to a noise level detector 52, a speech detector 53 and an input memory 54.

The noise level detector 52 receives the feature vectors and holds them in a buffer memory. The noise level detector 52 monitors the input level of the time sequence of feature vectors a1, a2, ..., ai, ..., aI and compares the input level with a threshold level. When the noise level detector 52 detects that the input level exceeds the threshold level, it calculates an average of data of the input level which are held in the buffer memory before the input level exceeds the threshold level. The average is delivered to the speech detector 53 and a beam width generator 52a as a noise level z.

The speech detector 53 receives the noise level z and compares the input level of the time sequence of feature vectors with the noise level z to produce a speech start signal as a signal SP when the input level becomes equal to or exceeds the noise level. Thereafter, the speech detector 53 also produces a speech end signal as the signal SP when the input level becomes lower than the noise level z.

The signal SP of the speech start signal is delivered to a controller 55. Then, the controller 55 delivers a take-in signal i1 to the input memory 54. The input memory stores the time sequence of input feature vectors a1, a2, ..., ai, ..., and aI in this order in response to a time sequence of take-in signals i1.

The system has a reference memory 56 which memorizes a number of (N) reference patterns B1, B2, ..., Bn, ..., BN. Each of the reference patterns comprises a sequence of feature vectors, that is, Bn=b1n, b2n, ..., bjn, ..., bJN.

The controller 55 produces a reference pattern selection signal n1 for selecting one of the reference patterns to the reference memory 56. Thus, a particular one Bn of reference patterns is selected.

The controller 55 also produces a read signal 1 to the input memory and a reference memory 56. Then, ai of the input feature vectors is read out and delivered to an inter-vector distance calculator 57. Also, bjn of the reference vectors of the particular reference pattern Bn is read from the reference memory 56 and delivered to the inter-vector distance calculator 57.

The inter-vector distance calculator 57 calculates, in response to signal cl2 from controller 55, a distance dn(i,j) between the input vector ai and the reference vector bjn. The distance dn(i,j) is delivered to an asymptotic equation calculator 58.

The asymptotic equation calculator 58 calculates the following asymptotic equation (1):

$$gn(i,j)=dn(i,j)+\min\{gn(i-1,j-p)\}. \tag{1}$$

where p=0, 1, 2, ... and the second term of $\min\{gn(i-1,j-p)\}$ is a minimum value of $gn(i-1,j-p)$ along various values of p. The number of p is applied to the reference memory 56 by a signal p1 from the controller 55. An initial value of gn(i,j) is given by gn(0,0)=0.

Thus, the asymptotic equation calculator 58 calculates dissimilarities gn(i,j) for i=1, j=1, 2, ..., Jn, and n=1, 2, ..., N. The numerals (n, i, j) are indicated by a signal cl3 from the controller 55.

The asymptotic equation calculator 58 is provided with a decision circuit for deciding $\min\{gn(i-1,j-p)\}$ and a buffer memory for holding $\min\{gn(i-1,j-p)\}$ and gn(i,u).

On the other hand, the beam width generator 52a receives the noise level z and calculates, in response to signal cl1 from controller 55, a beam width factor α(z) in accordance with the following equation (2):

$$\alpha(z)=\alpha 0 \times (z/z9), \tag{2}$$

where z0 is a reference noise level, and α0 is a beam width factor at the reference noise level z0. In any event, the beam width generator 52a serves as a beam width factor calculating arrangement. The calculated beam width factor α(z) is delivered to a dissimilarity deciding circuit 59.

The dissimilarity deciding circuit 59 also receives all of gn(i,j) for i=1 and various values of j and n from the asymptotic equation calculator 58 and decides the minimum (gmin) of the gn(i,j). Then, the dissimilarity deciding circuit 59 calculates the following equation (3):

$$\theta(i)=gmin+\alpha(z) \tag{3}$$

Thereafter, the dissimilarity deciding circuit 59 decides, as decided gn(i,j), ones of gn(i,j) which fulfill the following condition:

$$gn(i,j)<\theta(i) \tag{4}$$

Then, the dissimilarity deciding circuit 59 delivers numerals of n and j giving the decided gn(i,j) as appropriate values by a signal b1 to the controller 55.

The controller 55 makes a set of i=i+1, j and the appropriate values of n and delivers (n,i,j) to the asymptotic equation calculator 58.

The asymptotic equation calculator 58 calculates gn(i,j) for the delivered (n,i,j) in the similar manner as described above. In the case, since n and j which do not fulfill the formula (4) are omitted, calculation of gn(i,j) is made simple.

In the manner described above, the calculation of the asymptotic equation of (1) is performed from i=1 to i=I, and dissimilarities Dn(I,Jn)=gn(I, Jn) between the time sequence of the input feature vectors and each of reference patterns B1, B2, ..., BN excluding the omitted n.

Those dissimilarities Dn(I,Jn)=gn(I,Jn) are delivered to a decision circuit 60.

When the controller 55 receives the signal SP indicating th end of the speech, the controller 55 delivers a deciding signal i2 to the decision circuit 60.

The decision circuit 60 is responsive to the deciding signal i2 and compares those dissimilarities Dn(I,Jn)=gn(I,Jn) with each other. The decision circuit 60, then, decides that the input speech coincides with a particular one of the reference patterns which gives the minimum one of the dissimilarities Dn(I,Jn)=gn(I,Jn).

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for recognizing a speech uttered as one of a number of reference patterns registered, said method comprising the steps of:
preliminarily storing in a memory noise levels and noise factors which correspond to said noise levels;
producing an input sound signal comprising an input speech signal representative of said speech uttered and a noise accompanying said input speech signal;
analyzing said input sound signal to produce an input pattern signal representative of a pattern of said input sound signal;
detecting a start and an end of said input speech signal in said input sound signal to produce a speech detection signal;
deriving, as a noise portion, a portion of said input pattern signal before said start of said input speech signal is detected to produce an average noise level;
accessing said memory to read one of said noise factors that corresponds to said average noise level;
deriving, as a speech portion, another portion of said input speech pattern during a time duration when said speech detection signal is representative of presence of said input speech signal;
indicating one of said reference patterns;
calculating a difference between a pattern of said speech portion and said one of said reference patterns and producing a product as a dissimilarity by multiplication of said difference and said one of said noise factors; and
comparing said dissimilarity with a threshold value to recognize said speech as said one of said reference patterns when said dissimilarity is equal to or lower than said threshold value.

2. A method as claimed in claim 1, wherein each of said reference pattern comprises first through m-th reference frequency component signals, said analyzing step comprises separating said input sound signal into a plurality of m different input frequency components to produce first through m-th input frequency band signals as said input pattern signal, said noise deriving step comprises deriving first through m-th noise frequency components of said noise from said first through m-th input frequency band signals to produce first through m-th noise frequency component levels as said average noise level, said accessing step comprises reading first through m-th noise frequency component factors, and said calculating and producing step comprises calculating first through m-th difference between said speech portion of said first through m-th input frequency band signals and said first through m-th reference frequency component signals, producing first through m-th products by multiplication of said first through m-th differences and said first through m-th noise frequency component factors, and calculating a sum, as said dissimilarity, of said first through m-th products.

3. A method for recognizing a speech uttered as one of a number of reference patterns B1 through Bn, each of the reference patterns comprising a time sequence of reference feature vectors Bn=b1n, ..., bjn, ..., bJn, which comprises:

(a) producing an input sound signal comprising an input speech signal representative of said speech uttered and a noise accompanying said input speech signal;
(b) analyzing said input sound signal to produce an input pattern representative of a pattern of said input sound signal;
(c) observing said input pattern to detect a start and an end of said input speech and to produce a noise level z from a portion of said input pattern before said start is detected;
(d) calculating a beam width factor $\alpha(z)=\alpha0\times(z/z0)$ where z0 is a reference noise level and $\alpha0$ is a beam width factor for the reference noise level z0;
(e) deriving another portion of said input pattern as an input speech pattern after said start is detected, said input speech pattern A comprising a time sequence of input feature vectors A=a1, ..., ai, ..., aI;
(f) calculating inter-vector distances dn(i,j) between one of input feature vectors ai and each of reference feature vectors bjn for n=1 to N and j=1 to J;
(g) calculating from those dn(i,j) the following asymptotic equation (1);

$$gn(i,j)=dn(i,j)+gmin\{gn(i-1,j-p)\} \tag{1}$$

where p=0, 1, 2, ..., and gmin{gn(i−1,j−p)} is a minimum of gn(i−1,j−p) for various value of p;
(h) selecting the minimum one of gn(i,j) for n=1 to N and j=1 to J as gmin and calculating a threshold value $\theta i = gmin - \alpha(z)$;
(i) deciding as decided gn(i,j) ones of gn(i,j) which fulfill the following condition:

$$gn(i,j) < \theta(i) \tag{2};$$

(j) omitting n and j which do not fulfill the formula (2);

(k) repeating the steps (f) to (j) for i=i+1 until i=I to produce dissimilarities of Dn(I,Jn)=gn(I,Jn) for reference patterns except ones omitted at step (j); and (l) selecting the minimum one of those dissimilarities Dn(I,Jn) for the reference patterns and deciding said input speech as one of the reference patterns which gives said minimum dissimilarity.

4. A system for recognizing a speech uttered which comprises:

reference memory means for memorizing a number of reference patterns;

means for producing an input sound signal comprising an input speech signal representative of said speech uttered and a noise accompanying said input speech signal;

means coupled to said producing means for analyzing said input sound signal to produce an input pattern signal representative of a pattern of said input sound signal;

input memory means coupled to said analyzing means for memorizing said input pattern signal;

speech detecting means coupled to said producing means for detecting a start and an end of said input speech signal in said input sound signal to produce a speech detection signal, said speech detection signal representing presence and absence of said input speech signal in said input sound signal;

means coupled to said speech detecting means for holding said speech detecting signal;

noise level detecting means coupled to said input memory means and said holding means for deriving, as a noise portion, a portion of said input pattern signal before said start is detected to produce an average noise level;

noise level/factor memory means for memorizing noise levels and corresponding noise factors;

accessing means coupled to said noise level detecting means and said noise level/factor memory means for accessing said noise level/factor memory means to read one of said noise factors which corresponds to said average noise level;

calculating means coupled to said reference memory means, said input memory means and said accessing means for calculating a difference between a pattern of a speech portion of said input pattern signal and one of said reference patterns and producing a product as a dissimilarity by multiplication of said difference and said one of said noise factors; and deciding means coupled to said calculating means for comparing said dissimilarity with a threshold value to decide said speech as said one of said reference patterns when said dissimilarity is equal to or lower than said threshold value.

5. A system as claimed in claim 4, wherein each of said reference pattern comprises first through m-th reference frequency component signals, said analyzing means comprises means for separating said input sound signal into a plurality of m different input frequency components to produce first through m-th input frequency band signals as said input pattern signal, said noise level detecting means comprises means for deriving first through m-th noise frequency components of said noise from said first through m-th input frequency band signals to produce first through m-th noise frequency component levels as said average noise level, said accessing means comprises means for reading first through m-th noise frequency component factors, and said calculating means comprises means for calculating first through m-th differences between said speech portion of said first through m-th input frequency band signals and said first through m-th reference frequency component signals, means for producing first through m-th products by multiplication of said first through m-th differences and said first through m-th noise frequency component factors, and means for calculating a sum, as said dissimilarity, of said first through m-th products.

6. A telephone number dialing device of a speech access type which comprises said system as claimed in claim 4, said reference memory means further memorizing telephone numbers corresponding to said reference patterns, and dialing means coupled to said reference memory means and said deciding means for reading a particular one of said telephone numbers corresponding to said particular reference pattern to perform a dialing operation of said particular telephone number.

7. A system for recognizing a speech uttered, which comprises:

reference memory means for memorizing a number of reference patterns Bl through BN, each of the reference patterns comprising a time sequence of reference feature vectors Bn=bln, . . . , bjn, . . . , bJn;

means for producing an input sound signal comprising an input speech signal representative of said speech uttered and a noise accompanying said input speech signal;

means coupled to said producing means for analyzing said input sound signal to produce an input pattern representative of a pattern of said input sound signal;

observing means coupled to said producing means for observing said input pattern to detect a start and an end of said input speech and to produce a noise level z from a portion of said input pattern before said start is detected;

means coupled to said observing means responsive to said noise level z for calculating a beam width factor $a(z)=a0\times(z/z0)$ where z0 is a reference noise level and a0 is a beam width factor for the reference noise level z0;

input memory means coupled to said analyzing means for memorizing another portion of said input pattern as an input speech pattern after said start is detected, said input speech pattern A comprising a time sequence of input feature vectors A=al, . . . , ai, . . . , aI;

distance calculating means coupled to said reference memory means and said input memory means for calculating inter-vector distances dn(i,j) between one of input feature vectors ai and each of reference feature vectors bjn for n=1 to N and j=1 to J;

asymptotic equation calculating means coupled to said distance calculating means for calculating from those dn(i,j) the following asymptotic equation (1);

$$gn(i,j)=dn(i,j)+gmin\{gn(i-1,j-p)\}, \quad (1)$$

where p=0, 1, 2, . . . , and gmin{gn(i−1,j−p)} is a minimum of gn(i−1,j−p) for various value of p;

selecting means coupled to said asymptotic equation calculating means and said beam width factor calculating means for selecting the minimum one of $gn(i,j)$ for $n=1$ to $N$ and $j=1$ to $J$ as gmin and calculating a threshold value $\theta i = gmin - \alpha(z)$, said selecting means deciding as decided $gn(i,j)$ ones of $gn(i,j)$ which fulfill the following condition:

$$gn(i,j) < \theta(i) \qquad (2);$$

control means coupled to said reference memory means, said input memory means, said distance calculating means, said asymptotic equation calculating means and said selecting means for omitting n and j which do not fulfill the formula (2) and making said distance calculating means, said asymptotic equation calculating means and said selecting means repeatedly operate for $i=i+1$ until $i=I$ to produce dissimilarities of $Dn(I,Jn) = gn(I,Jn)$ for reference patterns except ones omitted; and means coupled to said asymptotic equation calculating means for selecting the minimum one of those dissimilarities $Dn(I,Jn)$ for the reference patterns and deciding said input speech as one of the reference patterns which gives said minimum dissimilarity.

* * * * *